(12) United States Patent
Luce

(10) Patent No.: US 11,155,128 B2
(45) Date of Patent: Oct. 26, 2021

(54) WHEEL MONITORING DEVICE

(71) Applicant: LDL Technology SAS, Ramonville Sainte Agne (FR)

(72) Inventor: Dominique Luce, Bordes-de-Riviere (FR)

(73) Assignee: LDL TECHNOLOGY SAS, Ramonville Saint Agne (FR)

( * ) Notice: Subject to any disclaimer, the term of this patent is extended or adjusted under 35 U.S.C. 154(b) by 385 days.

(21) Appl. No.: 16/004,505

(22) Filed: Jun. 11, 2018

(65) Prior Publication Data

US 2018/0361805 A1    Dec. 20, 2018

(30) Foreign Application Priority Data

Jun. 19, 2017  (FR) ...................................... 1755559

(51) Int. Cl.
*B60C 23/04*           (2006.01)
(52) U.S. Cl.
CPC ...... *B60C 23/0494* (2013.01); *B60C 23/0433* (2013.01); *B60C 23/0496* (2013.01); *B60C 23/04* (2013.01)
(58) Field of Classification Search
None
See application file for complete search history.

(56) References Cited

U.S. PATENT DOCUMENTS

| 5,040,561 | A |   | 8/1991 | Achterholt |  |
|---|---|---|---|---|---|
| 5,844,131 | A | * | 12/1998 | Gabelmann | B60C 23/04 |
|  |  |  |  |  | 73/146.8 |
| 6,175,301 | B1 | * | 1/2001 | Piesinger | B60C 23/0433 |
|  |  |  |  |  | 116/34 R |
| 6,534,711 | B1 | * | 3/2003 | Pollack | H01L 23/057 |
|  |  |  |  |  | 174/529 |
| 6,662,665 | B1 | * | 12/2003 | Huang | B60C 23/0408 |
|  |  |  |  |  | 73/146 |
| 6,993,962 | B1 | * | 2/2006 | Ko | B60C 23/0408 |
|  |  |  |  |  | 73/146.5 |

(Continued)

FOREIGN PATENT DOCUMENTS

| DE | 20 2016 101336 U1 | 3/2016 |
| EP | 0 417 712 A1 | 3/1991 |

OTHER PUBLICATIONS

Institut National De La Propriete Industrielle, French Patent Application 1755559, Written Opinion on the Patentability of Invention, dated Dec. 2, 2018 (French).

*Primary Examiner* — Jill E Culler
(74) *Attorney, Agent, or Firm* — Paul & Paul

(57) ABSTRACT

The invention relates to a wheel monitoring device (D) of the type comprising a housing (100) formed from a hollow core (101) containing different components including an electronic board (500) and a power supply battery (600) for said board (500), said housing (100) being positioned inside the tire and fixed to the internal portion (220) of the valve (200) fitted on the wheel, a polymer material filling in the free volume. The device is remarkable in that the housing (100) is preformed so as to provide at least two different superposed parallel installation planes (P1, P2) on which the different components are distributed, said housing (100) being preformed with a lateral opening to enable the different components to slide laterally into their appropriate installation plane (P1, P2).

9 Claims, 9 Drawing Sheets

(56) References Cited

U.S. PATENT DOCUMENTS

| | | | |
|---|---|---|---|
| 2002/0046599 A1* | 4/2002 | Chuang | B60C 23/0408 |
| | | | 73/146 |
| 2003/0154779 A1* | 8/2003 | Polenghi | B60C 23/0494 |
| | | | 73/146.8 |
| 2004/0034454 A1* | 2/2004 | Ito | B60C 23/0408 |
| | | | 701/1 |
| 2004/0046649 A1* | 3/2004 | Sanchez | B60C 23/0494 |
| | | | 340/443 |
| 2004/0055371 A1 | 3/2004 | Sanchez | |
| 2004/0155763 A1 | 8/2004 | Lin | |
| 2006/0071765 A1* | 4/2006 | Lin | B60C 23/0408 |
| | | | 340/442 |
| 2006/0075812 A1* | 4/2006 | Luce | B60C 23/0494 |
| | | | 73/146.8 |

* cited by examiner

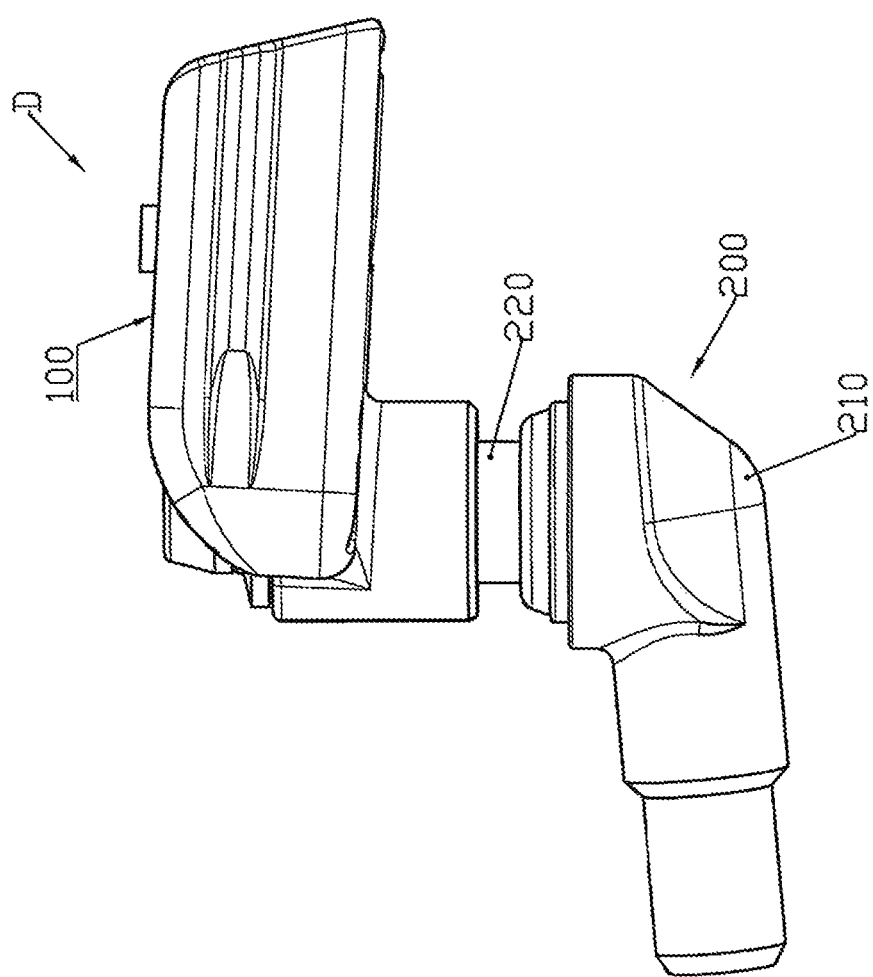

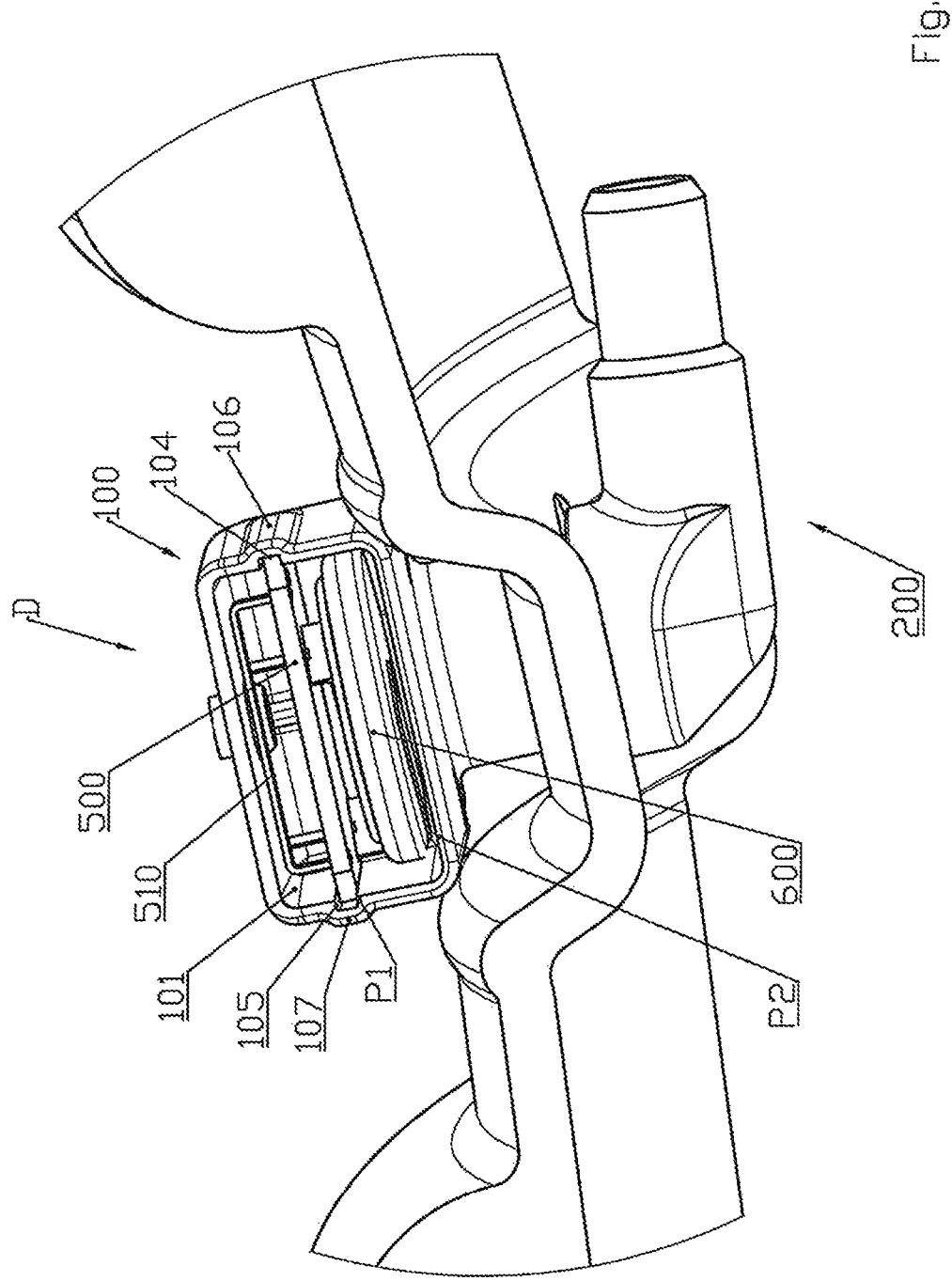

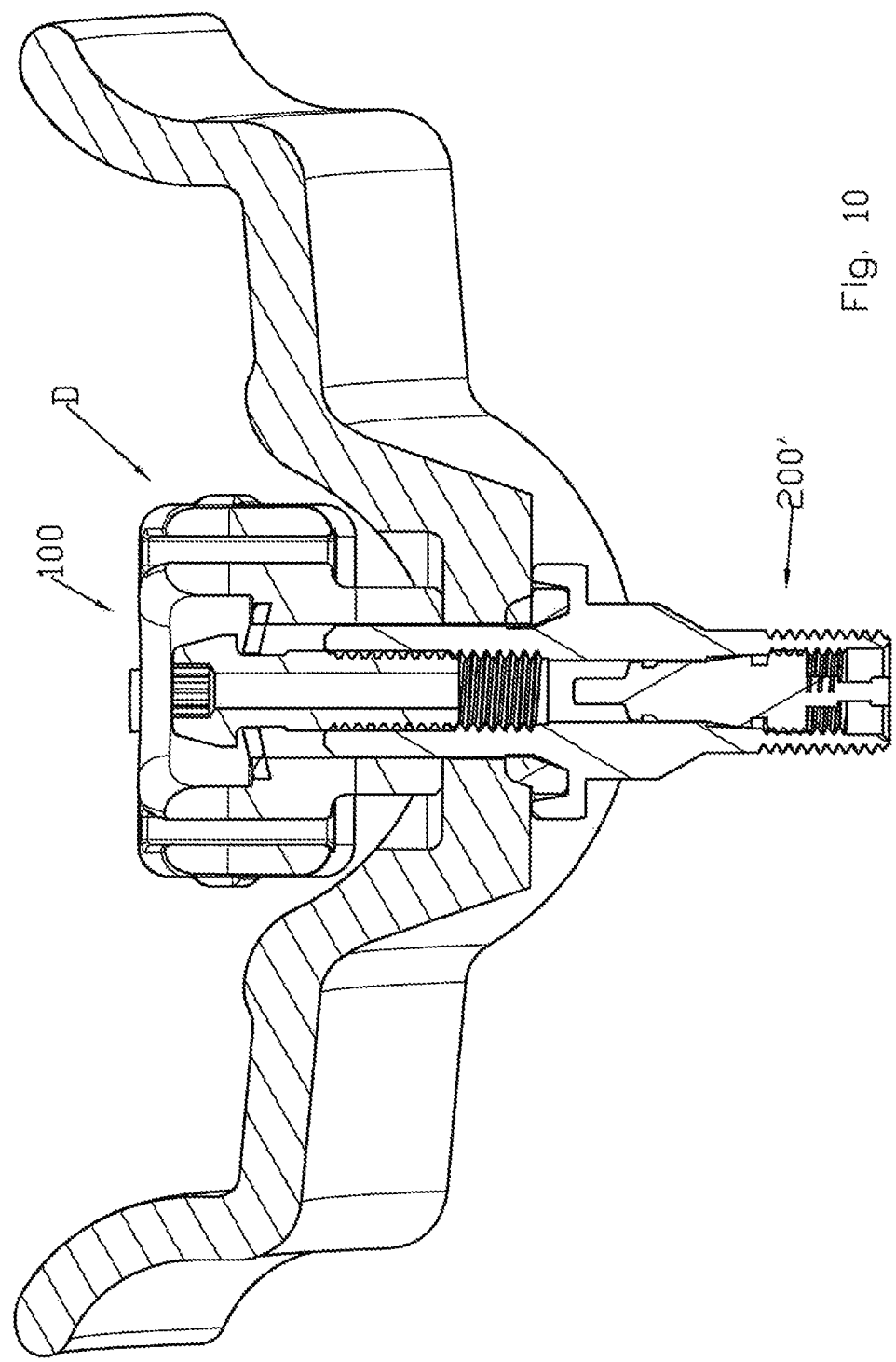

WHEEL MONITORING DEVICE

CROSS-REFERENCE TO RELATED APPLICATION

This application claims the priority of French Patent Application 1755559, filed Jun. 19, 2017, which is incorporated herein in its entirety.

FIELD OF THE INVENTION

This invention relates to the field of wheel monitoring devices, particular devices used in tire pressure monitoring or tire monitoring systems.

DESCRIPTION OF PRIOR ART

There are electronic systems designed to monitor characteristics such as:
 the tire pressure,
 the tire temperature,
 the acceleration of the wheels of a vehicle,
 etc.

The implementation of such systems involves the association of one or several sensors placed on each wheel (usually inside the tire), that measures the required characteristics and transmits the corresponding information to an associated reception module in the vehicle chassis.

This sensor is classically in the form of a housing containing an electronic board and a power supply battery for said board. Said electronic board classically comprises a measurement taking module and a measured information transmission module including an antenna.

There are several technical solutions for attachment of said housing to the rim. One of these solutions consists of fixing said housing to the wheel valve.

One example of such a solution is described in document EP1647422. This document describes the installation of a detection housing inside a tire of the type that is fixed to the body of a valve. This installation includes the following elements:
 a detection housing containing detection components,
 a valve body,
 a seal type leak tightness means to form the seal between the valve body and the rim,
 a means of holding the valve body in position on the rim, that is preformed with a connection orifice provided for this purpose, said retaining means being separate from said detection housing,
 a connection module between the detection housing and the valve body.

This installation was remarkable in that at least one of the elements of said assembly, apart from the sealing means, was preformed such that a part of this element can penetrate into the connection orifice to bear on it when tangential stresses are applied to the assembly.

Such an assembly provided a solution to the problem of deformation of the seal due to the transfer of stresses applied to the housing during accelerations. It also disclosed a tightening solution without an external nut.

Said stresses are partly derived from the mass of the housing. The housing that contains said electronic board and the power supply battery for said board is also filled with a polymer material for reasons of leak tightness and retention in position. This material has the disadvantage that its mass is not negligible.

Furthermore, there are difficulties with the operation to fill the volume left free in the housing with a polymer material once the electronic board and the battery have been positioned inside. One difficulty lies in the fact that it is difficult to fill a parallelepiped shaped volume at the bottom of which there is the electronic board, without creating air bubbles. The board then forms an obstacle to filling. Bad filling can have negative consequences on taking measurements or on transmission due to the variation in the relative permittivity of the medium surrounding the electronic board.

Another disadvantage of this installation is that it requires the fabrication of complex components that make it more expensive, such as aluminum parts made by turning.

DESCRIPTION OF THE INVENTION

Starting from this state of the art and a predetermined specification, the applicant performed research with the objective of optimizing the design of a wheel monitoring device so as to simplify it and to reduce the fabrication cost.

This research led to the design and manufacture of a wheel monitoring device, said wheel comprising a tire mounted on a rim fitted with a valve comprising an external portion and an internal portion opening up inside the tire,
 said device being of the type comprising a housing formed from a hollow core containing different components including an electronic board and a power supply battery for said board,
 said electronic board comprising a plurality of functional modules including a measurement taking module and a measured information transmission module including an antenna,
 said housing being positioned inside the tire and fixed to the internal portion of said valve by means of a screwed connection,
 a polymer material filling in the free volume.

This device is remarkable in that the housing is preformed so as to provide at least two different superposed parallel installation planes on which the different components are distributed,
 said housing being preformed with a lateral opening to enable the different components to slide laterally into their appropriate installation plane.

This characteristic is particularly advantageous in that a superposed configuration enables the design of a housing with a smaller footprint. The superposed arrangement can reduce the area necessary to hold usual components installed in a housing of a wheel monitoring device. One consequence of this smaller footprint is lower mass and a smaller volume to be filled with polymer. Therefore the housing according to the invention is not only smaller, it is also lighter weight. In requiring less material, it becomes less expensive.

The proposed superposed configuration also defines an assembly by lateral sliding of the electronic board and the battery and consequently the creation of a lateral opening in the walls of the housing.

This lateral opening facilitates not only positioning of the different components including the board and the battery, it also facilitates the operation to fill free volumes enclosed by the walls and components contained in the polymer material. The filling nozzle has full access to each free volume without any interference from the board installation plane or the battery installation plane, forming an obstacle to passage of the filling polymer. Therefore the polymer material flows in through this lateral opening along the plane of the electronic board and the battery which limits trapping of bubbles during filling. The quality of the housing and its fabrication time are thus improved.

Furthermore, the reduction in the dimensions of the opening necessary for the installation of components on one face of the housing contributes to the stiffness of the housing.

According to another particularly advantageous characteristic of the invention, said housing is preformed so as to provide two different superposed parallel installation planes, a first installation plane in which the electronic board fits and a second installation plane in which the battery fits. The installation on two planes provides a good compromise between the height and the width of the stack.

According to another particularly advantageous characteristic of the invention, said housing is preformed with a lateral opening through which the electronic board and the battery can slide towards the axis of the valve into their corresponding installation planes.

In order to guarantee that the electronic board and other components can slide in the hollow core of the housing, according to another particularly advantageous characteristic of the invention, said housing is preformed such that the angle between the installation planes and the axis of the valve is less than 90 degrees. The centrifugal force contributes to retention and therefore prevents a potential separation. The different components can thus be installed by lateral sliding without locking. This angle is defined between the axis of the internal portion of the valve and the installation planes. According to one preferred but non-limitative embodiment, the angle is less than 85 degrees.

Since the mass is smaller, the elements participating in its installation can also be optimized. Thus, according to another particularly advantageous embodiment of the invention, said housing is preformed from a sleeve in which a hollow cylindrical core is formed that slides on the internal portion of the valve, said sleeve comprises two open ends, a first open end bearing on the surface of the rim once the sleeve has slid into position on the internal portion of the valve, the internal portion of the valve is provided with a threaded hollow core, a screw fitted with a head screws into said threaded hollow core and bears through its head on the second open end of said sleeve so as to hold said first open end bearing on the rim and thus fix the housing to this rim. This installation design is simple and inexpensive. No other machined or insert molded part is necessary. The screw located radially related to the wheel axis sandwiches the sleeve of the housing between the screw and the valve, leak tightness being achieved in the manner known in prior art. The adaptation to the rim thickness is made by the screw movement in the valve thread. The screw is hollow or is drilled to allow air to pass through it.

The reduction in the footprint and the mass makes it possible to design an installation that is not as well balanced relative to the axis of the internal portion of the valve to which the housing is fixed. Thus, according to another particularly advantageous characteristic, said housing is preformed to have an elongated geometry with one preformed end of said sleeve and a second open end to enable the electronic board and the battery to slide into place before filling with a polymer material. This geometry is simple and easy to fabricate.

Adaptation to the diameter of the valve passage hole was also designed so that there is no need to fabricate a different housing for each diameter. According to another particularly advantageous characteristic of the invention, the first open end of the sleeve is preformed with at least one notch with which the at least one preformed projection in an additional adapter dish cooperates, by sliding on said first open end to widen the bearing surface of the first open end in contact with the rim. Thus, the principal part of the device, namely the housing, does not change but added dishes can be fixed to the sleeve so that the same housing can be attached despite different hole diameters. This dish also performs the function of an upstand thermally insulating the housing from the rim and facilitating transmission by RF radio waves. It also has an advantage in that it enables installation of the housing according to the invention in profiles of the rim that are too narrow for said housing to fit.

According to another particularly advantageous characteristic of the invention, a spring washer is inserted between the screw head and the second open end of the sleeve. This technological choice assures a low cost anti-loosening function.

The device according to the invention thus has a simplified attachment configuration to the valve requiring minimal turning operations of aluminum parts.

According to another particularly advantageous characteristic of the invention, the hollow core is preformed to have grooves facing each other to form an installation plane and sliding surfaces for positioning the different components, the outside wall of the housing being preformed with ribs at said grooves. This characteristic contributes to the stiffness of said housing.

Said housing and said washer are advantageously made of polyamide with a 50% fiber content so that the housing can resist stresses due to rotation and tightening on the rim. This technical thermoplastic is designed in particular to resist temperatures of more than 150 degrees Celsius under load (heat deflection temperature under load according to standard ISO75).

The basic concepts of the invention have been presented above in their most elementary form, and other details and characteristics will become clearer after reading the following description with reference to the appended drawings giving one non-limitative example embodiment of a device according to the invention.

BRIEF DESCRIPTION OF THE DRAWINGS

FIG. 1 is a diagrammatic drawing of an external side view of an installation of one embodiment of a device according to the invention fixed to a knee valve;

FIG. 7 is a diagrammatic drawing showing a back view of the installation in FIG. 1 in which the plastic filling has been removed;

FIG. 10 is a diagrammatic drawing showing a sectional front view of the installation in FIG. 8 installed on a rim with the section plane passing through the axis of the straight valve;

DETAILED DESCRIPTION OF A PREFERRED EMBODIMENT

Figure 3:
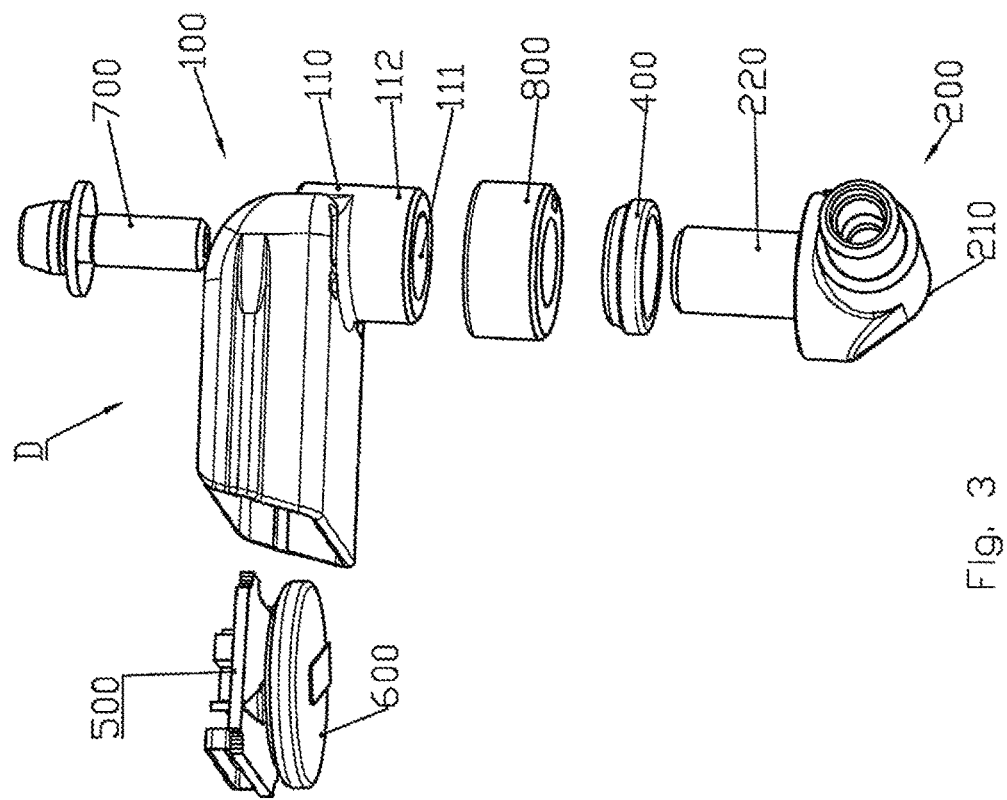
FIG. 3 is a diagrammatic drawing showing an exploded perspective view of the installation in FIG. 1 fitted with an additional dish.
Figure 2:
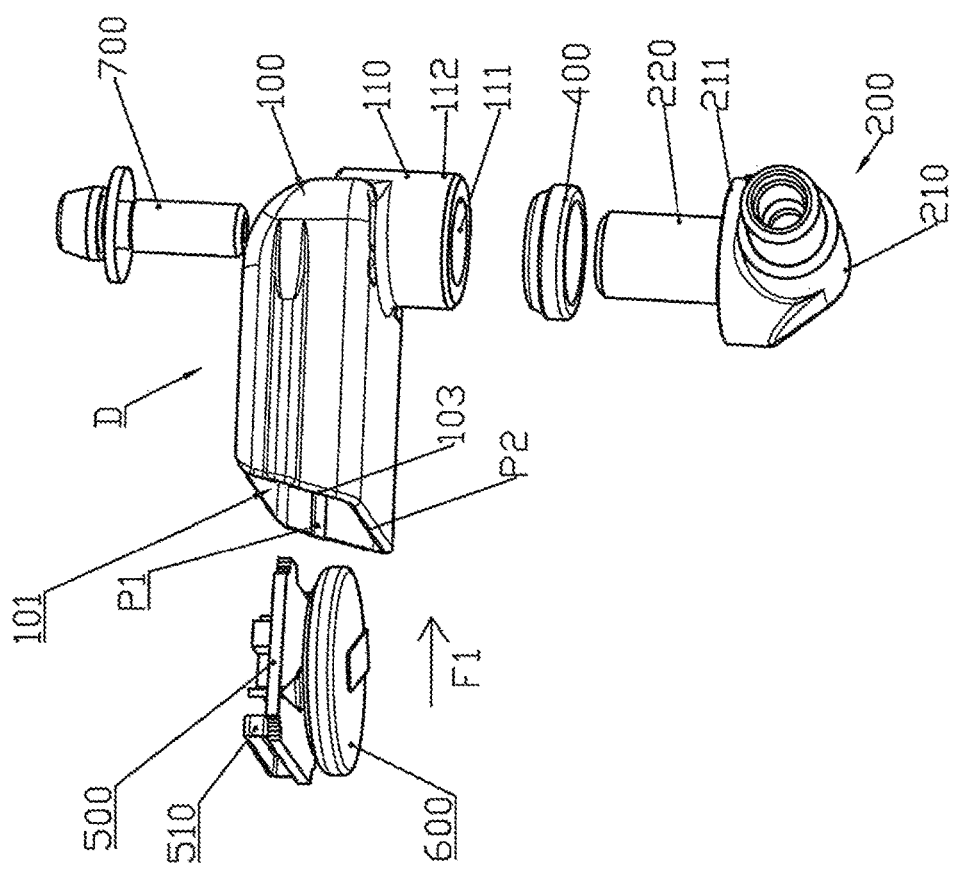
FIG. 2 is a diagrammatic drawing showing an exploded perspective view of the installation in FIG. 1.
Figure 4:
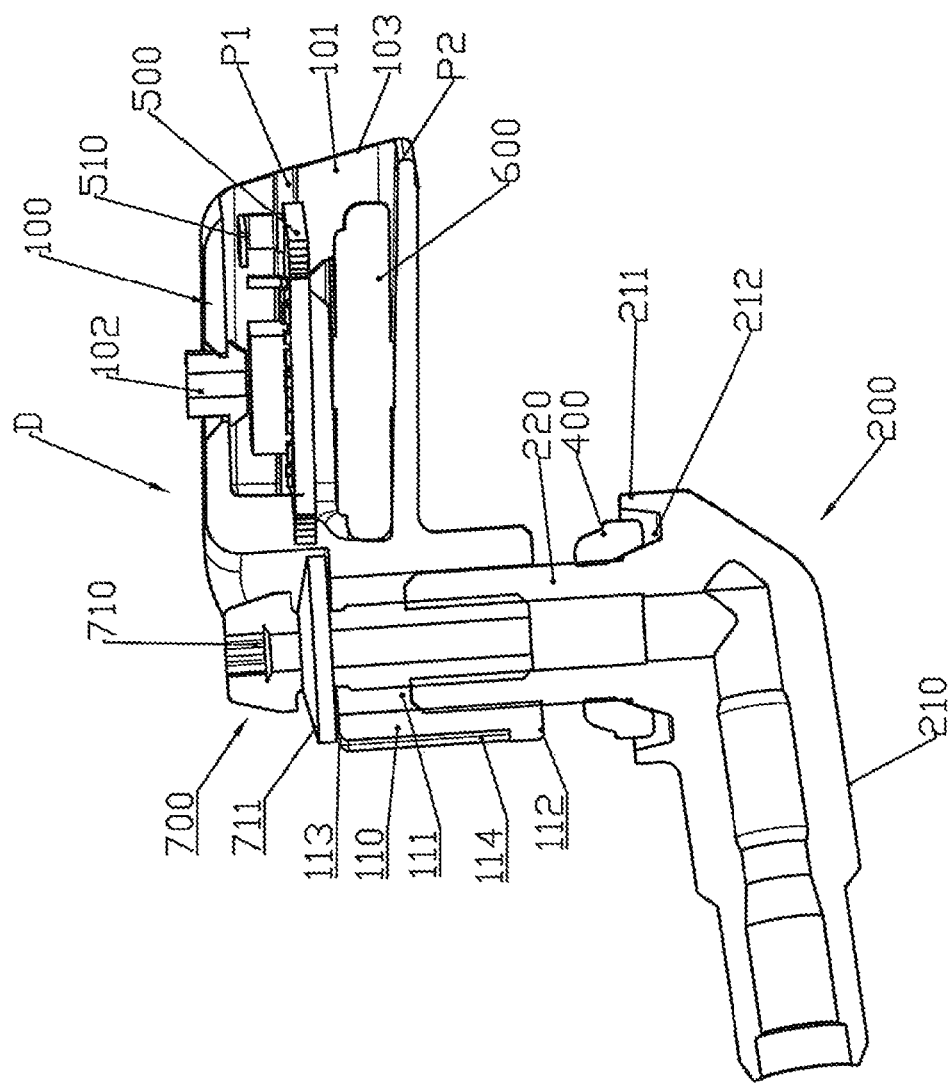
FIG. 4 is a diagrammatic drawing showing a sectional side view of the installation in FIG. 1.

As illustrated in the drawings on FIGS. 1, 2 and 4, the wheel monitoring device reference D as a whole comprises a housing 100 that is fixed to a valve 200.

Figure 6:
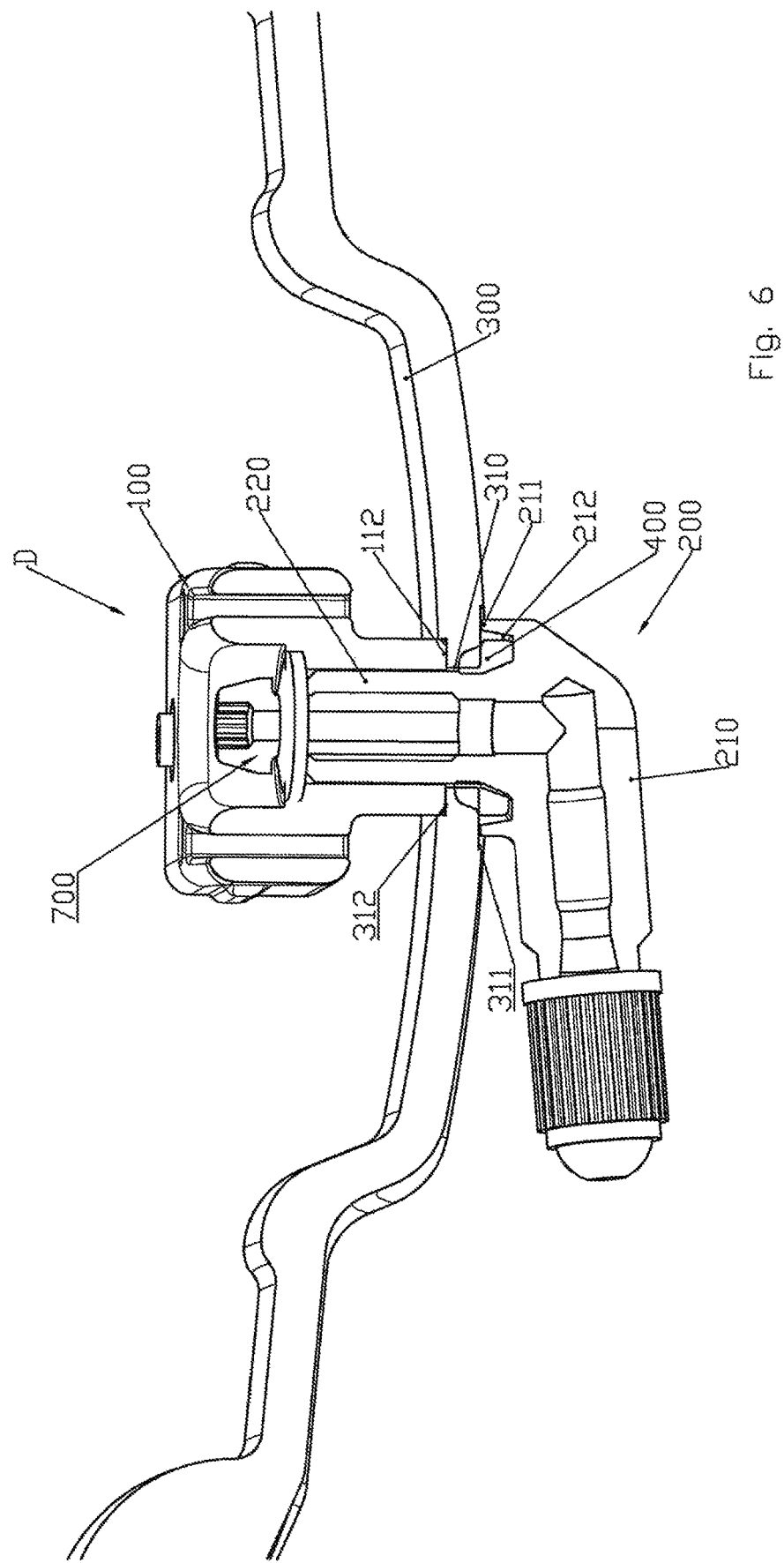
FIG. 6 is a diagrammatic drawing showing a sectional side view of the installation in FIG. 1 installed on a rim with the section plane passing through the axis of the knee valve.
Figure 9:
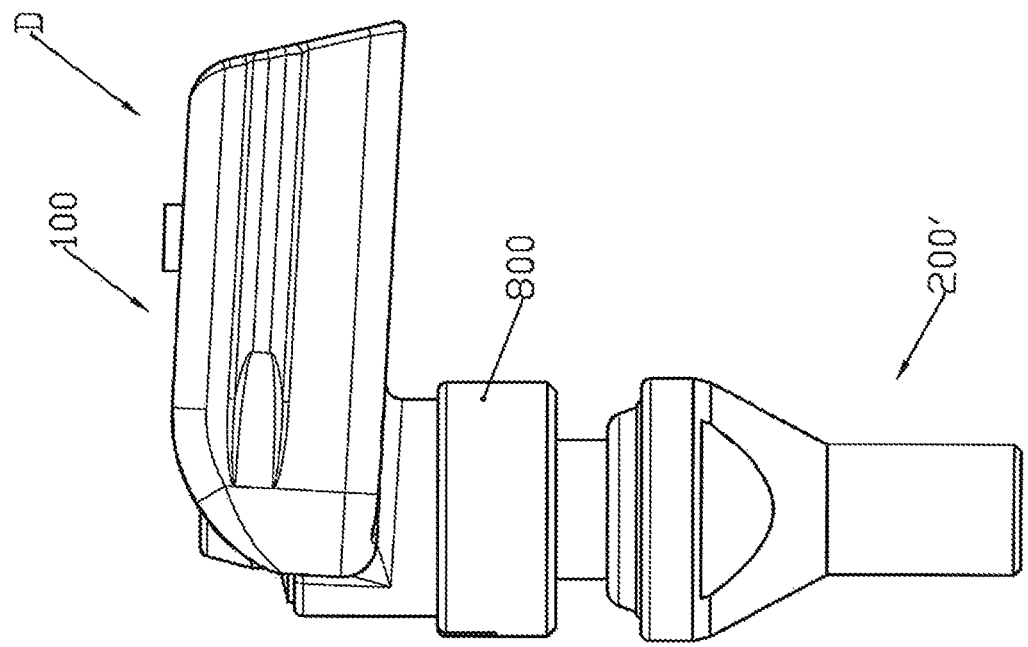
FIG. 9 is a diagrammatic drawing of the installation in FIG. 8 fitted with an additional dish.
Figure 8:
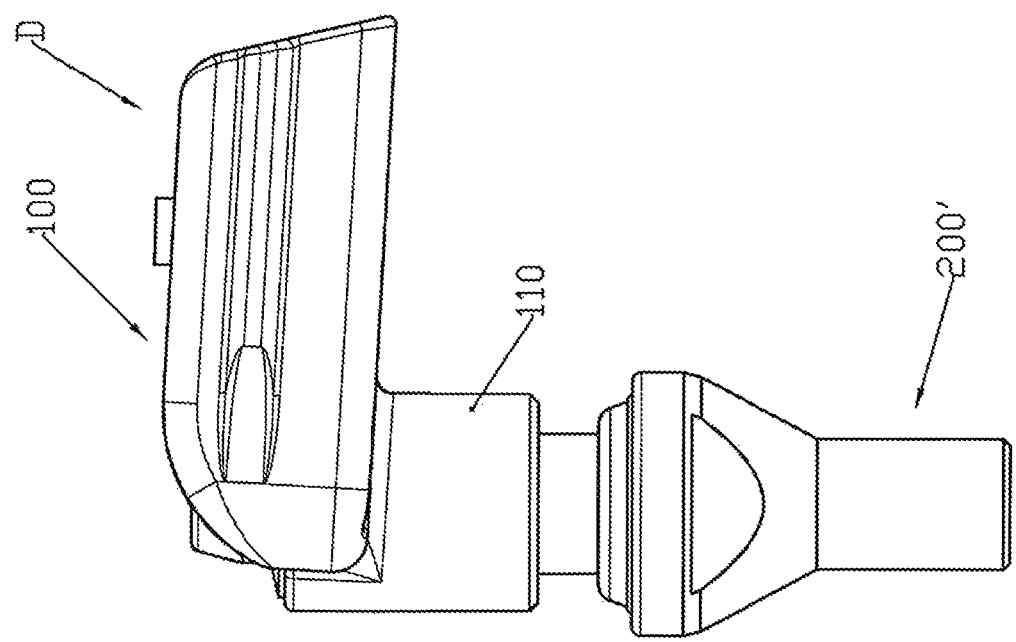
FIG. 8 is a diagrammatic drawing of an external side view of an installation of the embodiment of the device shown in FIG. 1 fixed on a straight valve.
Figure 11:
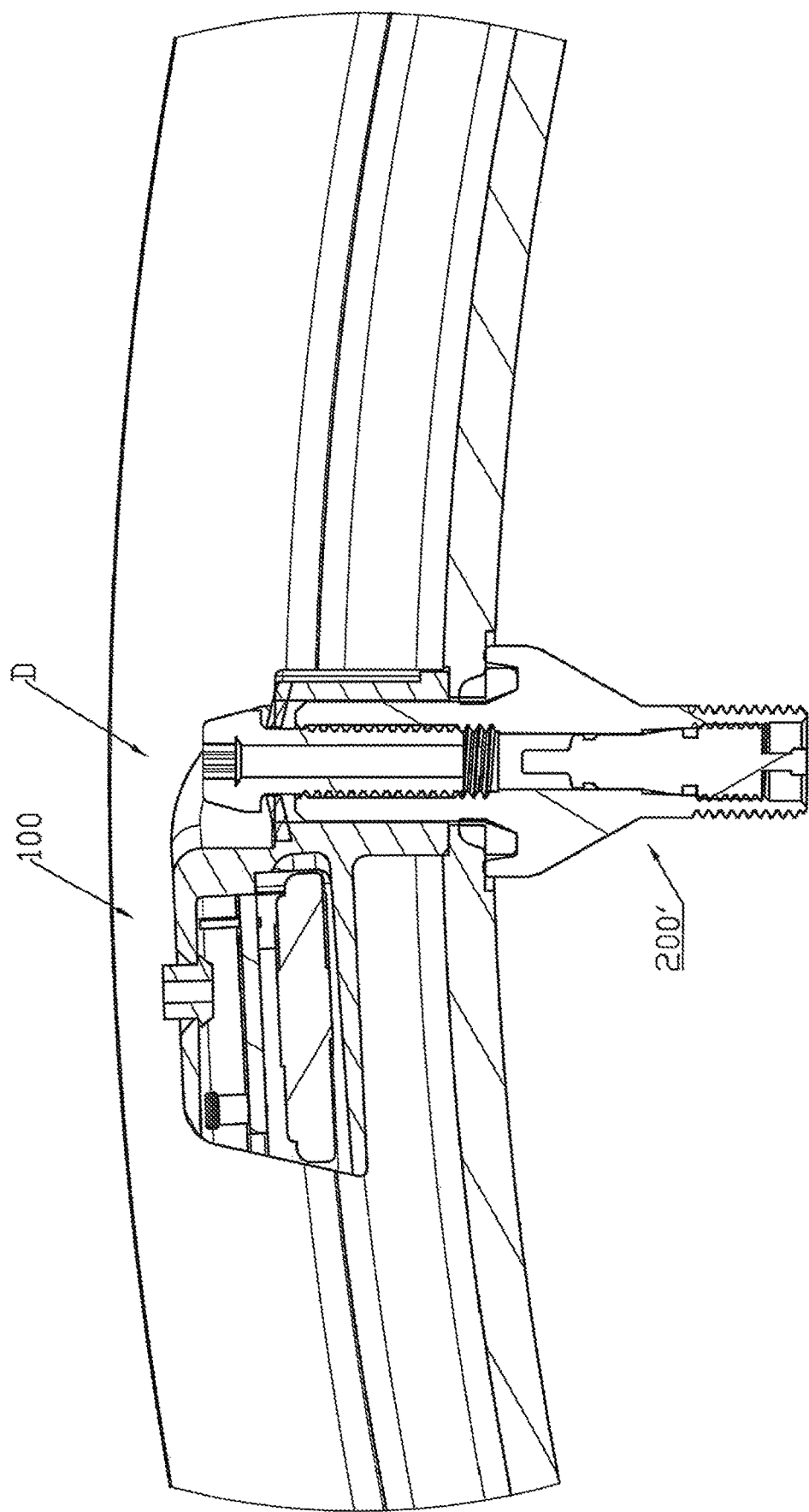
FIG. 11 is a diagrammatic drawing showing a sectional side view of the installation in FIG. 8 installed on a rim with the section plane passing through the axis of the straight valve.

More precisely, as is illustrated on the drawings in FIGS. 6 and 7, said wheel (not shown) comprises a tire (not shown) mounted on a rim 300 in which a through hole 310 is formed through which the valve 200 passes that thus has an external portion 210 accessible from the outside and an internal portion 220 that opens up inside the tire (not shown).

The external portion 210 comprises an air inlet and outlet orifice.

As illustrated on the sectional views in FIGS. 4 and 6, the internal portion 220 contains the housing 100 and is in the form of a hollow cylinder with a smooth external surface and with a threaded hollow core.

As illustrated on the drawing in FIG. 6, the external and internal faces of the rim 300 are preformed with spot facing 311 and 312 around the hole 310.

The external spot facing 311 acts as a bearing surface for a preformed collar 211 in the external portion 210 of the valve 200. This collar 211 is provided in its face oriented towards said external spot facing 311 with a circular groove 212 holding a seal 400 making the joint between the valve body 200 and the hole 310 in the rim 300 leaktight. A portion of this seal 400 is inserted in the hole 310 preformed for this purpose.

The external edge formed by the collar 211 of the groove 212 into which said seal 400 fits bears on said external spot facing 311 to resist stresses applied to the body of the valve 200 during rotation of the wheel due to the presence of device D, thereby avoiding excessive deformation of the seal 400.

As illustrated on the drawings in FIGS. 1, 2 and 4, the housing 100 is composed of a generally elongated useful volume of which one end called the front end is associated with an attachment module 110 to the valve 200. The useful volume or hollow core 101 is delimited by a plurality of walls holding an electronic board 500 and a power supply battery 600 for said board 500.

Said electronic board 500 is in the form of a printed circuit supporting a plurality of functional modules including a measurement taking module and a measured information transmission module including an antenna 510.

Although not illustrated so as to improve the readability of the drawings, a polymer material (polyurethane) is present in all free volumes of the hollow core 101 not occupied by said printed circuit 500 and the battery 600. Nevertheless, an orifice 102 (see FIG. 4) is formed in the wall of the housing 100 so that the measurement taking module can be in communication with the interior of the tire for the purpose of measuring the pressure, while being positioned in the housing 100.

As illustrated and in accordance with the invention, the housing 100 is preformed so that there are two installation planes P1 and P2 in its hollow core 101 for the different components to be installed.

These planes P1 and P2 are distinct and located at different heights, superposed and parallel to each other. Plane P1 is located approximately at mid-height between the top wall and the bottom wall of the housing 100. Plane P2 is located in the low position near the bottom wall of said housing 100.

The first installation plane P1 holds the electronic board 500 while the second installation plane P2 holds the battery 600.

The back wall 103 of said housing 100 is open to form a lateral opening providing access to the hollow core 101 and so that the electronic board 500 and the battery 600 can slide into their installation planes P1 and P2 respectively during fabrication of the device D. This lateral sliding movement is illustrated by the arrow F1 on the drawing in FIG. 2.

This opening formed by the back wall 103 also forms the access point for the nozzle (not shown) for filling with the polymer material (polyurethane). It will be understood that this filling operation requires an innovative fabrication method, remarkable in that it comprises the following operations:

sliding of the components in their corresponding installation plane, placement of a plug in the orifice 102, filling, removal of the plug to enable the measurement module to communicate with outside the housing 100, in other words with the interior of the tire.

The figures clearly show the small volume made possible by the superposed configuration defined by the invention.

According to the illustrated embodiment, the edge of this open back wall 103 defined by the back end of the housing is provided with a chamfer at the upper and lower walls. This chamfer prevents damage in case of contact between the housing 100 and the tire wall.

As illustrated, the housing 100 is preformed such that according to the preferred but non-limitative embodiment illustrated, the installation planes P1 and P2 make an angle equal to 85 degrees from the axis of the internal portion 220 of the valve 200.

As illustrated on the drawing in FIG. 7, the installation plane P1 is formed by preforming the hollow core 101 in its lateral walls to provide grooves 104 and 105 facing each other in which said installation plane P1 can be installed, and sliding surfaces for positioning the electronic board 500.

As illustrated, the longitudinal lateral walls of the housing 100 are preformed with stiffening ribs 106 and 107 on the outside at said grooves 104 and 105.

The housing 100 is also preformed at its front end with a sleeve forming the attachment module 110 to the valve 200. This sleeve 110 is provided with a cylindrical hollow core 111 that slides on the hollow cylinder with a smooth external surface of the internal portion 220 of the valve 200. The sleeve 110 and the useful volume delimited by the walls surrounding the hollow core 101 of the housing 100 form one single-block assembly made of a polyamide thermoplastic with a 50% fiber content.

Said sleeve 110 comprises two open ends 112 and 113. A first lower open end 112 bears on the inner spot facing 312 of the rim 300. A screw 700 with an axial hollow core screws into said threaded hollow core of the internal portion 220 of the valve 200. This screw 700 bears through its head 710 on the second upper open end 113 of said sleeve 110 so as to hold said first end 112 bearing in contact with the rim 300 and thus fix the housing 100 to this rim 300. Therefore the attachment of the device D is made by an internal screwed connection that cannot be unscrewed from the outside. As illustrated, a spring washer 711 is inserted between the head 710 of the screw 700 and the second end 113 of the sleeve 110.

According to one embodiment not illustrated, said second end 113 forms a tapered support surface to provide optimum space for said spring washer 711. This spring washer 711 prevents loosening.

Figure 5:
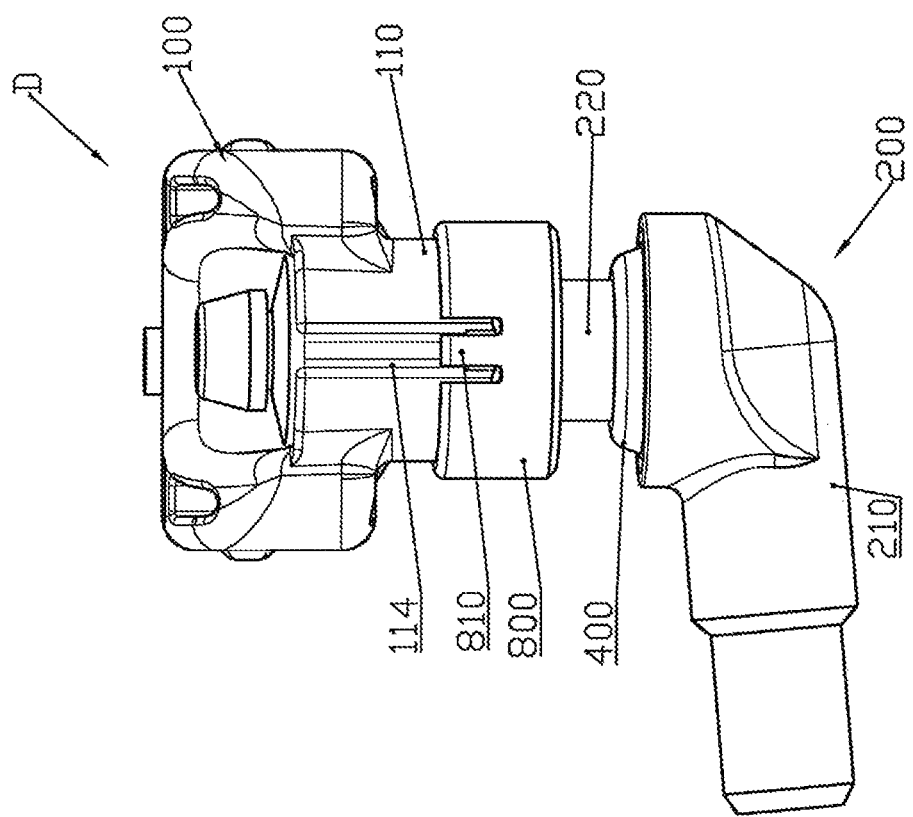
FIG. 5 is a diagrammatic drawing showing an external front view of the installation in FIG. 3.

As illustrated on the drawing in FIG. 5, the first end 112 of the sleeve 110 is preformed with at least one notch 114 that cooperates with at least one preformed projection 810 in an additional adapter dish 800. As illustrated on the drawing in the figure, when necessary, this dish 800 fits onto said first end 112 to widen the bearing area of the first end 112 on the rim 300. Other dish dimensions are possible.

The drawings in FIGS. 8, 9, 10 and 11 illustrate another installation configuration of the same device D on a straight valve 200'. The installation is made without a dish for the drawings in FIGS. 8, 10 and 11 and with the dish 800 for the drawing in FIG. 9. The purpose of these drawings is to illustrate that the device D can be fitted on several types of valve.

It will be understood that the device that has just been described above and illustrated, was presented for the purposes of explanation rather than as a limitation.

Obviously, various arrangements, modifications and improvements can be made to the above example, without going outside the framework of the invention.

The invention claimed is:

1. Wheel monitoring device (D), said wheel comprising a tire mounted on a rim (300) fitted with a valve (200) having an axis and comprising an external portion (210) and an internal portion (220) opening up into the tire,
    said device (D) being of the type comprising a housing (100) formed from a hollow core (101) containing different components including an electronic board (500) and power supply battery (600) for said board (500),
    said electronic board (500) comprising a plurality of functional modules including a measurement taking module and a measured information transmission module including an antenna (510),
    said housing (100) being positioned inside the tire and fixed to the internal portion (220) of said valve (200) by means of a screwed connection,
    a polymer material filling in the free volume,
    wherein the housing (100) is preformed so as to provide at least two different superposed parallel installation planes (P1, P2) on which the different components are distributed,
    said housing (100) being preformed with a lateral opening to enable the different components to slide laterally into their appropriate installation plane (P1, P2),
    said housing (100) being preformed with a sleeve (110) in which a hollow cylindrical core (111) is formed that slides on the internal portion (220) of the valve (200),
    said sleeve (110) comprising two open ends (112, 113), a first open end (112) bearing on the surface of the rim (300) once the sleeve (110) has slid into position on the internal portion (220) of the valve (200),
    the internal portion (220) of the valve being provided with a threaded hollow core,
    a screw (700) fitted with a head (710) being screwed into said threaded hollow core and bearing through its head (710) on the second open end (113) of said sleeve (110) so as to hold said first open end (112) bearing on the rim (300) and thus fix the housing (100) to this rim.

2. Device (D) according to claim 1, CHARACTERIZED BY THE FACT THAT
    said housing (100) is preformed so as to provide a first installation plane (P1) of the at least two different superposed parallel installation planes (P1, P2) holding the electronic board (500) and a second installation plane (P2) of the at least two different superposed parallel installation planes (P1, P2) holding the battery (600).

3. Device (D) according to claim 2, CHARACTERIZED BY THE FACT THAT the hollow core (101) of the housing (100) is preformed to have grooves (104, 105) facing each other to form the installation plane (P1) and sliding surfaces for positioning the different components, the outside wall of the housing (100) being preformed with ribs (106, 107) at said grooves (104, 105).

4. Device (D) according to claim 1, CHARACTERIZED BY THE FACT THAT the electronic board (500) and the battery (600) can slide towards the axis of the valve (200) into their corresponding installation planes (P1, P2) through the lateral opening.

5. Device (D) according to claim 1, CHARACTERIZED BY THE FACT THAT said housing (100) is preformed such that the angle between the installation planes (P1, P2) and the axis of the valve (200) is less than 90 degrees.

6. Device (D) according to claim 1, CHARACTERIZED BY THE FACT THAT the first open end (112) of the sleeve (110) is preformed with at least one notch (114) with which at least one preformed projection (810) in an adapter dish (800) cooperates, by sliding on said first open end (112) to widen the bearing surface of the first open end (112) in contact with the rim (300).

7. Device (D) according to claim 6, CHARACTERIZED BY THE FACT THAT said housing (100) and said adapter dish (800) are made of polyamide with a 50% fiber content.

8. Device (D) according to claim 1, CHARACTERIZED BY THE FACT THAT a spring washer (711) is inserted between the head (710) of the screw (700) and the second open end (113) of the sleeve (110).

9. Device (D) according to claim 1, CHARACTERIZED BY THE FACT THAT said housing (100) is preformed to have an elongated geometry with one preformed end of said sleeve (110) and a second open end (103) to enable the different components to slide before filling with the polymer material.

* * * * *